July 16, 1940.  W. L. CARLSON ET AL  2,207,783
TEMPERATURE COMPENSATED CAPACITOR
Filed Dec. 31, 1937

Inventors
WENDELL L. CARLSON
ROBERT L. HARVEY

Attorney

Patented July 16, 1940

2,207,783

UNITED STATES PATENT OFFICE 2,207,783

TEMPERATURE COMPENSATED CAPACITOR

Wendell L. Carlson, Haddonfield, and Robert L. Harvey, Oaklyn, N. J., assignor to Radio Corporation of America, a corporation of Delaware Application December 31, 1937, Serial No. 182,710

3 Claims. (Cl. 175—41)

This invention relates to capacitors, particularly to fixed capacitors and has special reference to the provision of improvements in temperature compensated capacitors for use in signaling systems.

The principal object of the present invention is to provide a capacitor which shall exhibit a zero or some desired negative or positive temperature coefficient of capacitance over a wide temperature range.

Another object of the present invention is to provide a moisture-proof temperature compensated capacitor which, by reason of its simplicity and economy of parts, lends itself readily to mass production methods.

Still another object of the present invention is to provide a tubular capacitor wherein the effect of changes in the spacing between certain electrode surface areas due to variations in the ambient are obviated by compensating changes in the spacing of certain other electrode surface areas.

Figure 1:
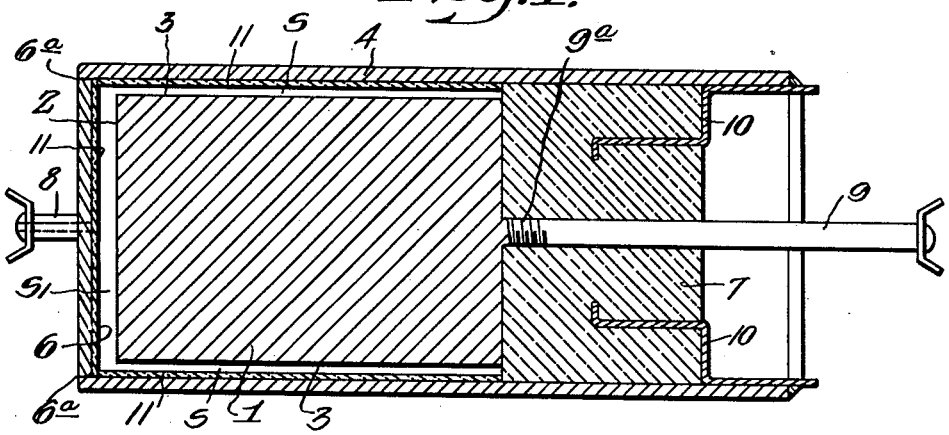
Figure 2:
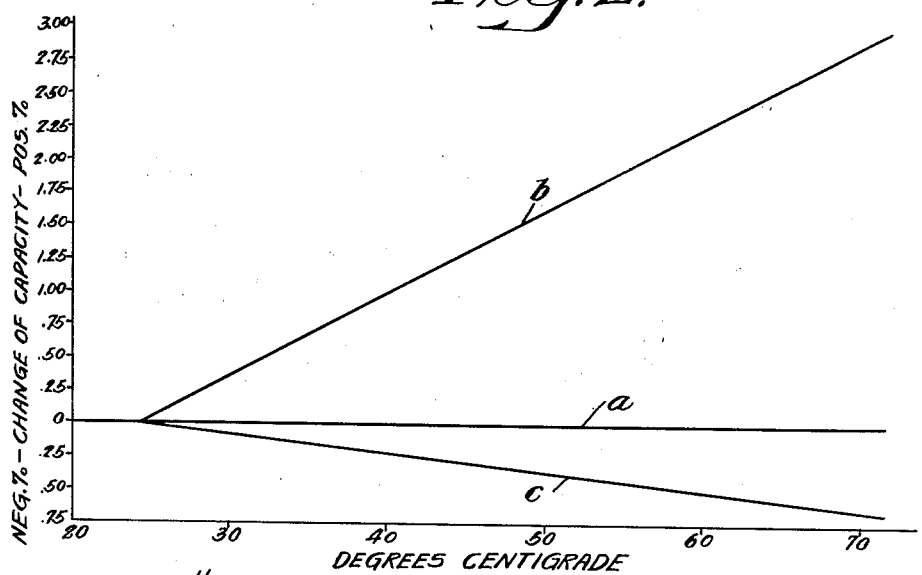
Figure 3:
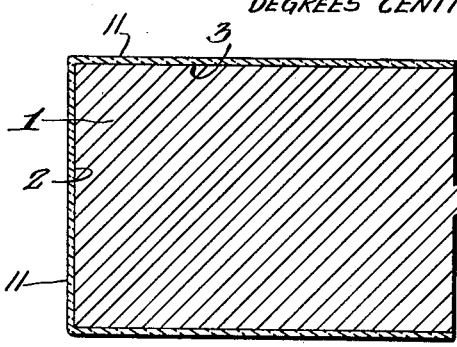

Other objects and advantages, together with certain details of construction, will be apparent and the invention itself will be best understood by reference to the following specification and to the accompanying drawing, wherein Figure 1 is a longitudinal sectional view of a tubular temperature-compensated capacitor embodying the invention, Figure 2 is a chart which will be referred to in explaining the constructional operating characteristics of the capacitor of Fig. 1, and Figure 3 is a longitudinal sectional view of an alternative form of electrode construction which may be used in carrying the invention into effect.

In order to compensate for changes in capacitance incident to changes in temperature, the present invention contemplates, and its practice provides, a capacitor comprising a pair of spaced electrodes constituted of different metals whose relative coefficient of expansion is such as to normally produce a substantial change in the spacing of said electrodes when they are subjected to temperature variations. The change in spacing thus produced tends to produce a change in capacitance, but this tendency is obviated by the provision of means for producing another and simultaneous change in the spacing which compensates for the first mentioned change in spacing. Thus, referring to Fig. 1, the invention may be embodied in a capacitor comprising a closed-end cylindrical electrode 1 formed, for example, of steel or of a nickel alloy such as "invar," which presents its plane and cylindrical electrode surfaces 2 and 3 to the interior of a closed cylindrical brass electrode 4 across an intervening space S, S1. When these cylinders are subjected to an increase in temperature, the outer brass cylinder 4 will expand more than the inner steel cylinder 1 so that space S1 intermediate the plane (end) surfaces 2, 6 and the space S intermediate the cylindrical (side) electrode surfaces 3 and 5 will tend to enlarge and cause the capacitor to exhibit a more or less negative temperature coefficient of capacitance. However, in accordance with the invention, the inner cylinder 1 is supported adjacent the otherwise open-end of the outer cylinder 4 by a mass of styrol or other insulating material 7, the coefficient of expansion of which is substantially greater than that of the metals of which these cylinders are constituted. As a result, when the temperature to which these electrodes 1 and 4 are subjected is increased, there is a longitudinal force exerted by the expansion of the mass 7 upon the inner cylinder 1 which brings its end surface 2 relatively closer to the inner end surface 6 of the outer cylinder 4.

When the insulating material 7 is of suitable mass, and the normal spacing between the end plates 2 and 6 is correctly chosen, the change in capacitance incident to the longitudinal movement of the inner cylinder 1 will exactly compensate for the change in capacitance between the cylindrical surfaces 3 and 5 caused by the change in the spacing between said surfaces. The closer the initial spacing between the end plates 2 and 6, the greater the change (with temperature) of the "compensating" capacitance therebetween. Thus, a capacitor having a coefficient of capacitance of either sign and any desired value may be achieved by proper initial spacing between the end plates. This is brought out in the chart of Fig. 2 which shows three lines, $a$, $b$ and $c$ indicative of temperature-capacitive characteristics for different "normal" spacings between the end surfaces 2 and 6.

In the capacitor whose temperature-capacitive characteristics is indicated by line $a$ the spacing between the end plates 2 and 6 was of a certain optimum value (in this case $\frac{1}{32}$") calculated to endow the capacitor with a zero temperature coefficient of capacitance over a temperature range of substantially 25° C. to 75° C. In capacitor $b$ the initial or "normal" spacing between the end plates 2 and 6 was appreciably less than that of capacitor $a$ (it was actually .005") so that the change in capacitance adjacent these electrode surfaces was considerably greater than that required to compensate for the change in capacitance (with temperature changes) adjacent the cylindrical electrode surfaces 3 and 5; as a result, the device exhibited a positive temperature coefficient of capacitance. In capacitor c the "normal" spacing between the end plates 2 and 6 was greater (by about $\frac{1}{32}''$) than in the case of capacitor a so that under compensation, resulting in a negative temperature coefficient of capacitance, was achieved.

In order to provide any desired initial spacing between the electrode surfaces 2 and 6, the end plate 6 may be removably or adjustably seated within the periphery of the outer cylinder, as indicated at 6a in the drawing. In order to measure the spacing between the opposed end surfaces of the cylinders the binding post 8 which is provided as an electrode terminal on the outer surface of the removable end plate 6 may be hollow so that a gauge, not shown, may be inserted therein.

A second binding post, in the form of a metal rod 9, extends in the opposite direction from the inner cylinder 1 through the insulating material 7 and through an orifice in a metal cup 10 to the exterior of the device. Bushing 10 is formed of relatively thin metal and constitutes a supporting means and seal for the internal parts of the capacitor. Rod 9 is preferably screw-threaded for a limited distance adjacent its inner end, as indicated at 9a, to increase the effective surface area presented to the insulating material at that point. The space between the screw threads 9a may be said to take up the slack occasioned by the sliding movement of the insulating material 7 along the rod 9 caused by the difference in the coefficient of expansion of the styrol mass and metal rod. The screw threads 9a further provide a better moisture-proof seal than would a smooth surface.

In order to obviate the possibility of short circuiting between the inner and outer cylinders, a thin coating 11 of styrol or other insulating material is provided in the space S and S1 intermediate these electrodes. The insulating material 11 should not fill the entire inter-electrode space; preferably it comprises a mere film or coating which may be applied as by spraying the inner surface of the outer cylinder, as in Fig. 1, or by dipping the inner cylinder, Fig. 3, in unpolymerized styrol and subsequently polymerizing the coating in situ.

Other modifications of the invention will suggest themselves to those skilled in the art. It is to be understood, therefore, that the foregoing is to be interpreted as illustrative and not in a limiting sense except as required by the prior art and by the spirit of the appended claims.

What is claimed is:

1. A capacitor comprising a metal cylinder having an end surface and a side surface presented in capacitive relation across an intervening space to the corresponding end and side surfaces of a second metal cylinder, the area of each of said side surfaces being sufficiently great to provide the predominant part of the useful capacitance of said capacitor, and means seated within the outer cylinder and comprising an insulating support for the inner cylinder for exerting a longitudinal force thereon when subjected to temperature changes whereby the spacing between said end surfaces is varied.

2. The invention as set forth in claim 1 wherein said support comprises a mass of insulating material having a coefficient of expansion greater than that of the metals of which said cylinders are constituted.

3. The invention as set forth in claim 1 wherein said support is constituted essentially of styrol.

WENDELL L. CARLSON.
ROBERT L. HARVEY.